TELEVISION TUBE
Original Filed Nov. 12, 1947 5 Sheets-Sheet 1
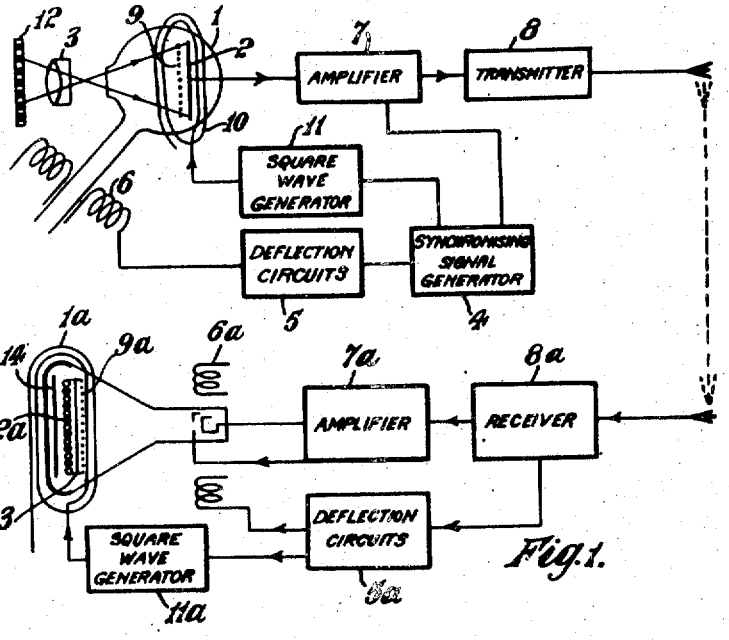
Fig.1.
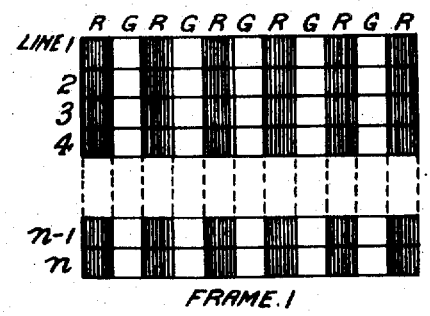
FRAME.1
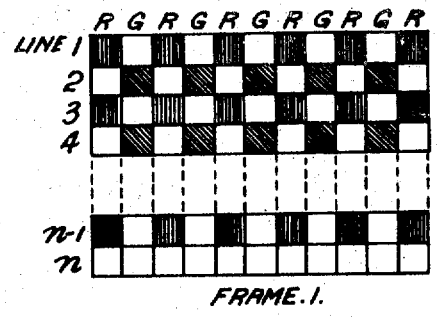
FRAME.1.
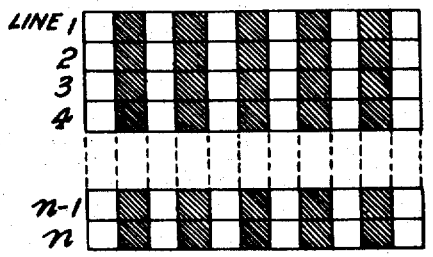
FRAME 2
Fig.2a.
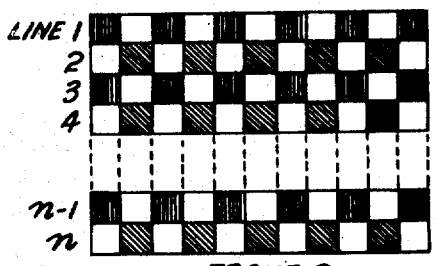
FRAME 2
Fig.2b.
Inventor
Ferenc Okolicsanyi
BY Lippincott & Smith
ATTORNEYS June 23, 1953 F. OKOLICSANYI Re. 23,672
TELEVISION TUBE
Original Filed Nov. 12, 1947 5 Sheets-Sheet 2
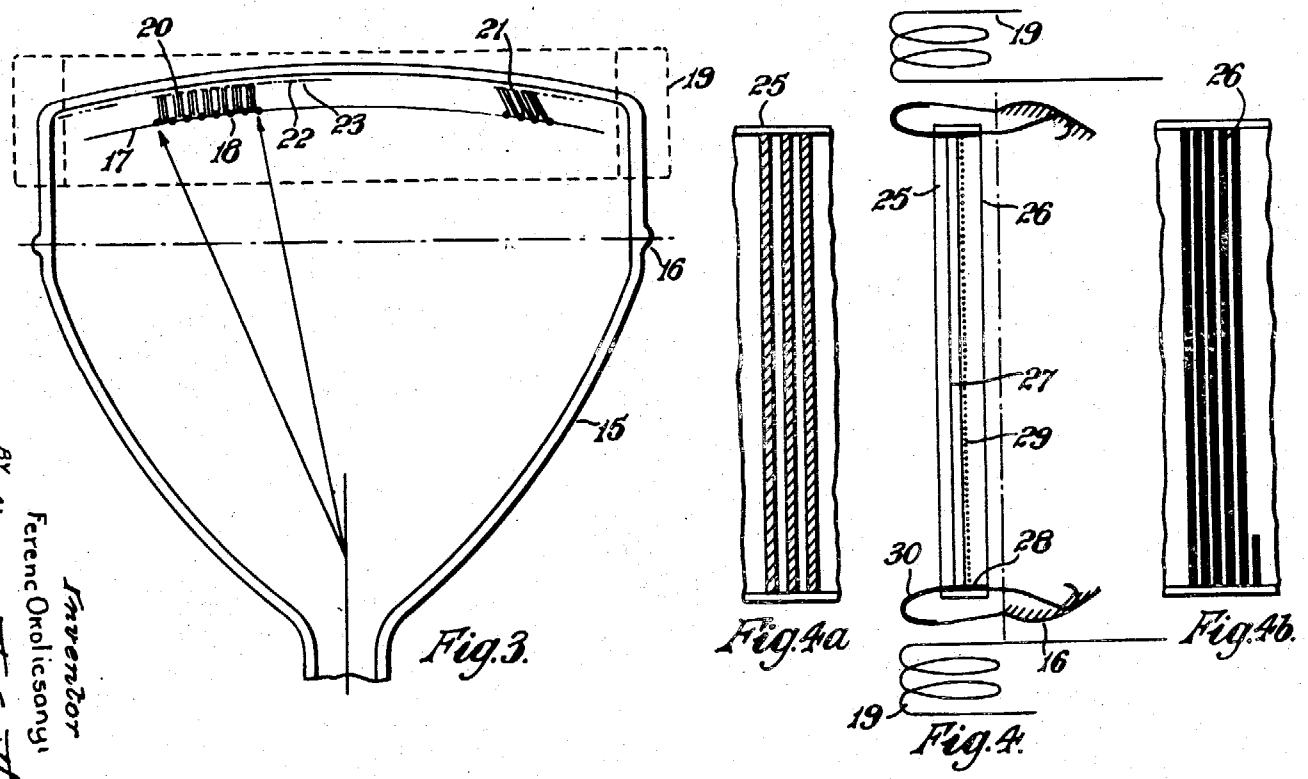
Inventor
Ferenc Okolicsanyi
BY Lippincott & Smith
ATTORNEYS Inventor
Ferenc Okolicsanyi
BY Lippincott & Smith
ATTORNEYS June 23, 1953 F. OKOLICSANYI Re. 23,672

TELEVISION TUBE

Original Filed Nov. 12, 1947 5 Sheets-Sheet 4

Inventor
Ferenc Okolicsanyi
BY Lippincott & Smith
ATTORNEYS

June 23, 1953 F. OKOLICSANYI Re. 23,672

TELEVISION TUBE

Original Filed Nov. 12, 1947 5 Sheets-Sheet 5

Inventor
Ferenc Okolicsanyi
BY Lippincott & Smith
ATTORNEYS

Reissued June 23, 1953

Re. 23,672

UNITED STATES PATENT OFFICE 23,672

TELEVISION TUBE

Ferenc Okolicsanyi, London, England, assignor, by mesne assignments, to Chromatic Television Laboratories, Inc., a corporation of California Original No. 2,532,511, dated December 5, 1950, Serial No. 785,417, November 12, 1947. Application for reissue November 26, 1952, Serial No. 322,839. In Great Britain November 16, 1946

3 Claims. (Cl. 315—21)

Matter enclosed in heavy brackets [ ] appears in the original patent but forms no part of this reissue specification; matter printed in italics indicates the additions made by reissue.

The present invention relates to systems and methods for the conversion of electrical signals into luminous images and vice versa, and has for its main object the provision of a system wherein a colour shift is performed by purely electronic means without the use of moving parts.

The invention in its simplest form is based upon the phenomenon that if a fine grid composed of very thin parallel wires, preferably metallic wires, is placed close to the picture screen or a cathode ray tube (into the path of the electron beam if inside the tube), then a series of dark lines (the Crookes Shadow) appear on the screen behind the wires, whilst certain definite portions of the screen between the wires appear as lines of normal or even of increased brightness. By the application of a homogeneous static or magnetic field, the dark lines appear at different, slightly shifted places between the wires whilst the bright lines appear at previously dark places. The wires can be placed so that they are parallel to the direction of the scanning lines or at right angles to them or at any intermediate angle, and the same phenomenon is observed. It is preferred, however, not to arrange them parallel to the scanning lines for reasons that will be explained hereinafter. From the foregoing it is obvious that a grid of this nature can be employed to impart a line structure to the reproduced image, the geometrical characteristics of this line structure being determined solely by the geometrical characteristics of the grid and being entirely independent of the scanning process employed to build up the picture. Furthermore, by connecting the grid or an electrode or the above said field to an energy source of an oscillatory nature of suitable waveform it is clear than the position of this line structure can be shifted backwards and forwards in space, but of course at the frequency of the oscillatory source.

This phenomenon is made use of according to one aspect of the invention to a television receiver by arranging a grid of this nature near to the picture screen and by arranging an oscillatory source of electric energy synchronised with incoming signals to cause the position of the line structure to depend at any instant upon the colour component being reproduced, an associated stationary optical system including alternating elements for imparting different colouring being arranged so that in any given position of the line structure the emergent light is in accordance with the momentarily transmitted appropriate colour.

According to another aspect of the invention the inverse of this arrangement is employed in a television transmitter tube of the iconoscope type, the optical system in this case being placed in the path of the incident light to produce an image on the signal-producing screen which consists of alternate strips of different colours, whilst the grid is arranged near the screen to cause the distribution of electrons produced by the scanning beam to assume a line structure the position of which coincides with the strips of one colour or the other according to the potential applied to the grid.

Theoretically, the direction of the grid wires and filter strips can form any angle with the direction of the scanning lines, but in practice it is preferred to arrange them at right angles to the line scanning direction. If they lie parallel and if their number differs slightly from the number of sharply adjusted scanning lines, unpleasant interference or striated (beat frequency) patterns will be formed. This possibility is completely avoided by arranging them at right angles.

It is clear that the arrangement of the present invention can be very easily arranged to receive several types of colour transmissions. For example if the colour is changed line-by-line instead frame-by-frame, a square wave oscillator would be locked to the line synchronising impulses, so that the line structure imparted by the voltages on the wire grid would be shifted in position at the line frequency. This is, of course, a very important feature of the invention in view of the effects of colour-flicker and thus of the "band-width" of transmission.

As will appear hereinafter the invention in its broadest sense is not limited to the provision of a grid in close proximity to the surface scanned by the actual cathode ray beam, nor is it limited to the provision of a colour shift voltage acting simultaneously over all parts of the scanned surface to shift the line structure from one position to the other.

To achieve the aims of the system of the invention, three distinct but co-operating elements are required. These elements are:

(I) means for imparting to the electron image made up by the scanning system of the receiver the above mentioned line structure. The geometrical characteristics of this line structure are determined solely by the geometrical characteristics of a grid, and are entirely independent of the scanning process employed to build up the picture. This grid will hereinafter be referred to as the "colour electrode" or as the "master grid."

(II) Means for deflecting or shifting the "electronic copy" of the master grid i. e. the electron image which has the line structure imposed thereon by the colour electrode, so that the bright lines therein may be moved into a number of positions which correspond to the number of colour components being transmitted. These means will hereinafter be referred to as the "colour deflector."

(III) Means for imparting to the electron image (or to the fluorescent image produced by said electron image) a number of colour components, one colour component corresponding to each of the positions which it may occupy under the influence of the colour deflector. These means will hereinafter be referred to as the "colour screen" or as the "colour raster."

It is not essential that the above three elements are necessarily structurally separated. For example, the colour electrode and the colour deflector may consist of one single grid structure, with which, however, are associated means for applying a fixed voltage to produce electron-optical cylindrical lenses to impart to the electron image its line structure, whereby the grid acts as the colour electrode, and also means for imparting a varying difference of potential between different parts of the grid, to cause the line structure to assume a number of different positions, whereby the grid also acts as the colour deflector. In general therefore the above described three elements are to be considered more by the functions they perform, though it will be clear that such functions cannot be performed without some related structure. However one single structure may perform two or more functions and one of the functions may even be performed by an electrode of the receiving tube which is also present to perform one of the functions of the usual known television receiving tube.

In its broadest aspect the invention therefore comprises a television system provided with a cathode ray tube including a scanned surface, means including a master grid arranged to impose a line structure on the electron distribution over said scanned surface, said line structure being an electronic copy of the master grid, means for periodically deflecting said line structure into two or more alternate positions in succession, and colour selective means arranged in fixed spatial relationship to said positions.

Various forms which the elements above referred to can take will now be described:

(I) The colour electrode or the master grid.—In the simplest case it consists of a grid or a slotted plate, which serves to cast an electron shadow on the final screen of the tube. It may in this case be at the same potential as this screen. It operates in the same manner as the well known "Crookes Shadow." Where, however, the final screen of the tube consists of a conductor, for example, in the form of a grid or a transparent metal layer (as will be described in more detail below with reference to the colour filter) an electron focussing effect may be produced, by maintaining a suitable difference of potential between the screen and the electrode.

Alternatively, two or more grid structures may be employed, held at different potentials, to bring about a focussing of the electrons into the desired line structure. The well known principles of design of electron optical system are applicable to the design of such multiple grid system.

(II) The colour deflector.—As mentioned above, in certain suitable cases, where the colour electrode is composed of a number of electrically separated parts, the function of the colour deflector may be realised by applying suitable potentials to the parts by the colour electrode. However, the deflection of the electron image which has imparted thereto a line structure by the colour electrode may be deflected by a suitable placed electromagnetic or electrostatic deflecting system. Such a system would have imparted thereto square wave currents or voltages derived from incoming synchronizing signals which correspond to changes in the colour component being transmitted. Such deflecting systems may follow well understood principles of design.

(III) The colour screen or raster.—This consists essentially of a structure which imparts to the reproduced image its desired colour characteristics. It has a subdivided structure in which strips of material having the property of imparting to the electron image (or its fluorescent optical counterpart) one colour component in one of the positions alternate with other strips of material capable of imparting to it the other colour component or components in its other position or positions.

To produce a visible image from an electron image in the standard television receivers, a fluorescent material is required. In the simplest arrangement for the purposes of explanation, the colour electrode simply consists of sets of alternating strips of different fluorescent powders, each set of which is fluorescent with one of the respective transmitted colour components. The colour deflector moves the electron image first on to one set, then on to the next, then on to the third (according to the number of colour components being transmitted). Fusion of the coloured lines may be achieved by interposing a ground glass screen at a suitable short distance from the fluorescent colour electrode.

However, a continuous fluorescent screen giving a white visible image may be used, in which case the colour screen may consist of a number of glass rods of different colours interwoven with a fine metallic wire cross-mesh to give added strength.

The exterior of a thin and flat mica plate inside the cathode-ray tube, having internally a white fluorescent screen, may be painted with suitable transparent paints of the required colours.

Although the main object of the invention is to provide means for effecting the reproduction of images in natural colours and the preceding description and succeeding particular description refers only to colour television it is obviously within the scope of the invention to transmit alternating groups of signals representing the members of a stereoscopic pair and to separate the images of the receiver by the methods of the present invention combined with the usual "two colours" method of stereoscopic reproduction. In other words, at the receiver the alternating groups of signals would have imparted thereto different colours by the methods of the present invention and would be viewed through spectacles having different coloured windows.

The invention will now be described by way of example with reference to the accompanying drawings in which:

Fig. 1 shows a complete system illustrating the invention in its simplest form;

Figs. 2a and 2b are explanatory diagrams of the operation of the system shown in Fig. 1;

Fig. 3 shows the arrangement of the control electrode of Fig. 1 in more detail;

Figs. 4, 4a and 4b show an alternative arrangement of colour electrode and colour screen;

Figure 5:
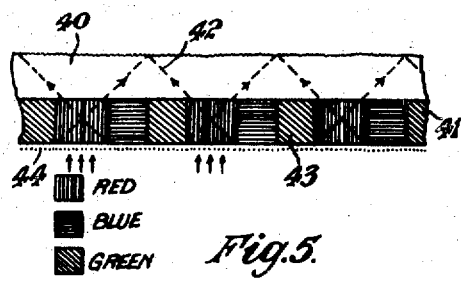
Figs. 5 and 5a show in detail methods of using a diffusion screen.

A complete colour television system incorporating the invention in its simplest form will be described with reference to Fig. 1 of the drawings. An iconoscope is provided with the usual screen and signal plate 2 upon which is focussed an image of the object to be transmitted by means of the lens 3 and which is scanned by an electron beam produced by an electron gun (not shown). A synchronizing signal generator 4 controls the sweep voltage generator 5 the output of which is connected to the sweep deflectors of the tube 1, one pair of which are shown at 6. The line and frame synchronizing signals are fed also through the amplifier 7 together with the picture signals from the signal plate to the transmitter 8 in the usual manner.

Inside the tube 1 and in front of the screen 2 is placed the colour electrode 9, consisting of a grid of fine wires closely spaced, the direction of the wires being at an angle to the line-scanning direction, preferably at a right angle as shown. The colour deflector consists of a coil 10 connected to a square-wave generator 11 synchronized by the generator 4 at either line or frame frequency. Deflecting currents thus flow through the coil 10 first in one direction and then in the other corresponding to the two halves of the square wave, the period of the alternation being at line or frame frequency. The colour screen comprises an optical filter 12 consisting of alternate strips of different colours parallel to and registering with the wires of the grid 9.

The optical image of the screen 2 will thus be coloured in alternate parallel strips, and the distribution of the electrons falling on the front face of the screen in consequence of the scanning process will be modified by the "Crookes Shadow" effect of the grid 9 so that they will be concentrated into lines running parallel to the coloured strips these lines being separated by shadow areas: furthermore in consequence of the geometrical arrangement of the filter 12 and the grid 9 the lines of electron concentration will coincide with the image strips of one colour whilst the shadows will coincide with those of the other colour. During this period, picture signals of one colour only will be transmitted and this state of affairs will persist until the deflecting current in the coil 10 changes: the electronic copy of the colour electrode 9 is then shifted so that the lines of electron concentration now occupy the positions previously occupied by the shadows, and picture signals of the other colour are transmitted.

At the receiver a similar process is employed for the reconstitution of the image and in Fig. 1 the parts of the receiver corresponding to those in the transmitter are given the same reference number with an added suffix. The colour electrode 9a and the colour screen 12a are the same as those at the transmitter but they are placed on opposite sides of the fluorescent screen 13 of the cathode ray tube 1a. The colour deflector coil 10a is energized by a current from the square wave generator 11a which is synchronized by the appropriate received line or frame synchronizing impulses. Clearly the electronic copy of the colour electrode 9a will produce a corresponding luminous image on the fluorescent screen 13 and the light from this image will pass through strips of the appropriate colour of the filter 12a according to the colour of the picture signals being transmitted. In order to avoid a striated or chequered appearance in the final image a ground glass screen 14 is provided to give the necessary diffusion.

Figs. 2a and 2b are diagrams which may assist in showing how the final image is built up according to whether the colour change occurs at frame or line frequency. Two colours, red (R) and green (G) are assumed to be employed. Figure 2a shows two successive frames in which the colour is changed at frame frequency, the direction of the picture lines being horizontal; Fig. 2b shows the two frames when the colour is changed at line frequency. Whilst either method of colour change can be employed, the main advantage of the present invention resides in the facility with which it enables a colour change at line frequency to be effected, thereby avoiding the well-known and distressing flicker that occurs with the frame-frequency colour change, unless impractically high frame recurrence frequencies are employed.

Clearly a receiver as shown in Fig. 1 can operate equally well when receiving colour transmission from a known type of transmitter. If, however, the colour change is at line frequency and the transmitter is of the usual type that always transmits the first line of each frame in the same colour, say red, then it is essential that an even number of scanning lines per frame be employed if colour reversal is to be avoided in each alternate frame. This will be clear from a study of Fig. 2b. Assume that line n—1 in frame I is the last line of the frame; then the first line of frame II will be line n of frame I and will be green instead of red. Similarly, in a three colour system the total number of lines per frame would have to be multiple of three, and so on.

It should be emphasized that the pitch of the colour electrodes 9 and 9a and the colour screens 12 and 12a are not dependent in any way upon the number of scanning lines per frame, nor is any registration between the scanning lines and the colour filter necessary, as with known system employing line frequency colour change. The pitch of electrode 9 and screen 12 or 9a and 12a must be the same and they must register correctly, but the registration between two physical bodies is not difficult to achieve. The pitch of 9a and 12a can be coarser than that of 9 and 12, but there is no point in making it finer.

The simple arrangement of Fig. 1 has been described in order that the principles underlying the invention may be clearly understood. Various refinements and modifications are necessary in practice and some of these will now be described.

In Fig. 3 is illustrated a receiver cathode ray tube fitted with a colour electrode combined with a magnetic type of colour deflector. The tube 15 having the usual seal at 16 contains a metallic (e. g. nickel) grid 17 acting as an electron shield and making a partial shadow in the form of many narrow, vertical black strips on the fluorescent screen 6. The grid 17 can be made out of a wire net formed by removing one half of a flat metal coil on a frame. Such wires are shown at 18. The deflecting coil 19 deflects the electrons into either the position shown at 20 or that shown at 21. On the fluorescent screen are strips 22 and 23, running at right angles to the plane of the paper, of different fluorescent salts emitting light of the desired colour components. An alternative arrangement is shown in Fig. 4. A set of coloured glass fibre rods, or strips 25, the diameter or width of which is 0.005 inch constitutes the colour filter and is shown in front elevation in Fig. 4a. This dimension allows nearly 1000 pairs in a cathode ray tube of 10'' diameter, thus giving the necessary subdivision vertically to equal the number of horizontal scanning lines. The colour electrode (Fig. 4b) is a metal sheet 26 with the same number of stamped-out slots 0.005'' wide, separated by gaps also 0.005'' wide. 27 is a thin mica sheet (less than 0.005'' thick) held in position by the frame 28, this sheet serving as a mounting or backing for the rods 25. On the opposite side of this sheet is coated a layer of fluorescent powder 29. Springs 30 fix the frame 28 to the glass wall of the cathode ray tube. Coils 19 act as colour deflectors and 16 is the seal line of the tube.

Figure 5A:
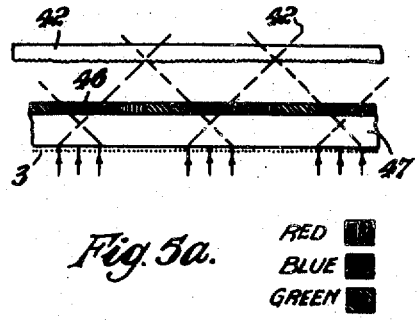
Figure 6A:
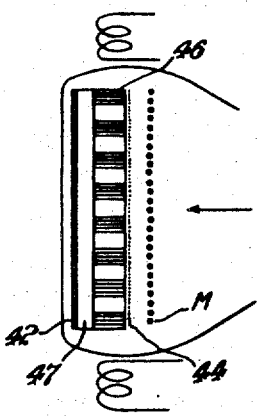
Figs. 6–6d show the use of electron lenses in place of a single grid for the colour electrode.

As mentioned in connection with Fig. 1 a ground glass screen can be used to avoid the striated appearance of the image on the fluorescent screen. One method of using such a screen is shown diagrammatically in Fig. 5, a three-colour system being shown. The screen 40 is placed in contact with the coloured glass rods 41 of the colour screen, and has such a thickness (which is calculated from the path of the edge rays 42 passing through neighbouring rods of a given colour) that the rays from neighbouring rods of a given colour just illuminate contiguous areas on the far side of the plate. Preferably the rods have a graphite coating 43 between them; in this figure they are of rectangular or square cross section (their length being perpendicular to the plane of the paper). They may be formed as one block from rectangular rods fitted together and ground and polished in one unit. The fluorescent powder (giving a white fluorescence) is coated on one side as indicated at 44. Figure 5a shows an alternative arrangement. A ground glass screen 42 is arranged at a suitable distance from the coloured filter strips 46 so that the edge rays 42 just begin to overlap. A thin mica sheet 47 carries the fluorescent material 44. In Fig. 6a an alternative arrangement of receiving tube is shown. The fluorescent layer 44 is mounted on the colour strips 46, and the ground glass screen 42 is separated from the strips by the mica sheet 47. A transparent metal layer (not shown) is formed on the fluorescent layer 44 to render it conducting. The grid 17 (the colour electrode) operating in conjunction with this layer, which is at a different voltage from the grid 17, causes the field to give rise to a number of electrostatic cylindrical lenses. The electron beam is thus focussed into a number of thin lines, instead of being (as in the previous arrangements) only being stopped or blacked out to form a shadow line structure. This gives more efficient use of the beam current. The conditions are illustrated in Fig. 6. The focal length F is given by the expression $$F=\frac{2V_G}{E_1-E_2}$$

and $$\frac{V_G}{V_A}=+9\%$$

Figure 6B:
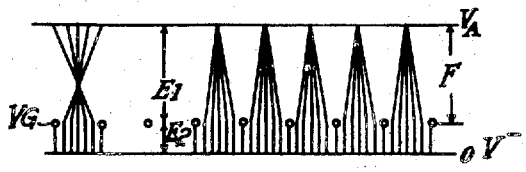

Due to the losses of light in the semi-transparent metal layer of Figs. 6a and 6b, an ideal electrostatic focussing is preferred, and which is given by two wire grids.

Figure 6C:
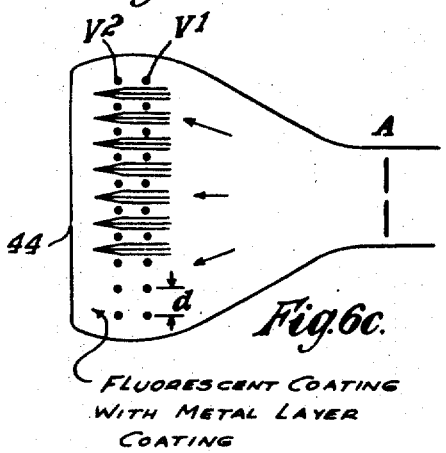

Fig. 6c illustrates such a two grid system, the grids having voltages $V_1$ and $V_2$ respectively relative to A, the last anode of the electron gun. If for instance $V_2$ is 50 volts and $V_1$ is 10 volts, then $V_2/V_1=5$; then at d=1 mm., the focal length F=6.5 mms. This "two-lens" system is the simplest, as it uses the full energy of the beam to produce useful light.

Figure 6D:
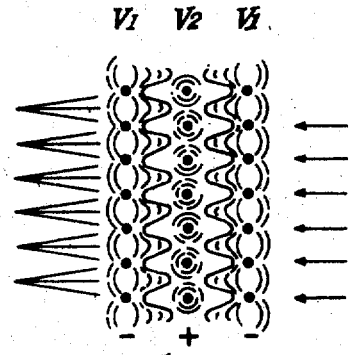

Fig. 6d illustrates the symmetrical or univoltage lens. This is a development of the "two-lens" system of Fig. 6c. In its "special form" (the cylindrical version) it is often reduced to simple apertures (i. e. holes or slots in three metal sheets).

Other types of lenses such as "aperture" and "immersion" lenses are too difficult to manufacture, but those shown in Figs. 6a–6d can be made by a normal coil winding machine by cutting the resulting coil in half.)

The experimental figures for the focal length of the symmetrical lens of Fig. 6d are as follows

| $\frac{V_2-V_1}{V_1}$ | F. (cms.) |
|---|---|
| 3 | 1 |
| 2½ | 2 |
| 2 | 4 |
| 1½ | 6 |

It must be remembered that the whole of any one set of parallel wires is at the same voltage in the arrangements of Figs. 6a–6c; consequently it is quite possible to choose the voltage $V_1$ many hundreds of volts minus or plus with respect to the anode voltage which might be +900 v.

Figure 7:
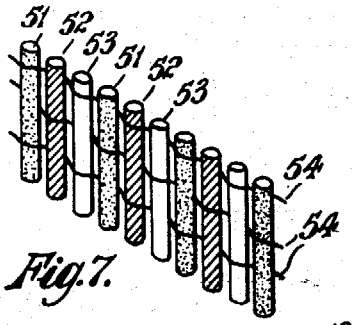
Fig. 7 shows one form of colour screen.

It has already been mentioned that in order to obtain focussing by means of a simple grid, it is necessary to establish a difference of potential between the grid and the fluorescent screen. The suggestion made above to achieve this was to coat the fluorescent screen with a transparent metal layer. Fig. 7 shows a form of optical filter which may be coated with fluorescent powder, in which the desired voltage may be applied to the screen without the necessity for using transparent metal layers which give losses of light. The optical raster is made by weaving a fabric from coloured glass threads 51, 52, 53 etc. in one direction with metal wires 54 in the other direction. The threads 51 are of one colour, the threads 52 of another and the threads 53 of the third colour corresponding to the desired colour components. All the ends of the wires 54 are connected electrically and have the desired voltage applied to them.

It will be clear that in all embodiments of the invention so far described, it is necessary that the colour electrode grid and the strips of the colour filter must have the same pitch, in order that the electron image registers with the colour filter strips of the desired colour, otherwise the wrong colouration of the reproduced image will result.

The desired accuracy can be obtained of course by care in manufacture to the necessary order of accuracy. However for a large number of lines, normal mass production technique may not give the necessary accuracy. In the case for instance of the fabric illustrated in Fig. 7, which may be wound with the glass fibres close together, in long lengths, variations will occur. To ensure that the grid has the same form as the colour filter, the following may be done. A piece of the fabric is cut out, sufficient for one cathode ray tube. A piece of thin nickel foil coated with sensitised gelatine has formed on it a full size optical image of this piece of fabric in light of one of the colours of the threads, e. g. blue. The nickel foil is now etched according to well known photo etching process, to an extent as to cut right through the foil. On removal of the gelatine, a grid as shown at 26 in Fig. 4b will result, with supporting crossbars across the slots at those points corresponding to the wires 54 of the fabric of Fig. 7. This grid will have the same pitch as, and will correspond in irregularities to, the piece of fabric from which it was produced, and is used with this piece. In this way the proper alignment is ensured.

Methods such as described in the previous paragraph, necessitating as they do the "pairing" of the colour screen and the colour electrode would not easily lend themselves to mass production. An alternative method for use in mass production is to start with a master structure of very large size and to form the colour screen from this by colour photography and the colour electrode by photo-mechanical processes such as photo-etching. The resulting products being organic or partly organic in structure could not be inserted directly inside a cathode ray tube: to avoid this difficulty they can be mounted inside a flat vessel of silica or heat resisting glass with very thin walls, which can itself be mounted in the tube.

An alternative method of enabling the colour screen to be introduced into the cathode ray tube is to form the colour filters of materials which can be introduced into a vacuum. For example, fluorescent powders, apart from their normal function have the appearance of green, yellow, orange or white paint in daylight illumination. Furthermore it is quite usual to employ colloidal graphite coatings for various purposes inside the tube and do not impair the vacuum process. Again, certain oxides such as chromium oxide, which is green, and iron-oxide ("rouge"), which is red, have a very low vapour pressure. Finally many kinds of inorganic chemicals such as oxides and other salts as used for fluorescence can be introduced into the vacuum either in very fine colloidal form the solvent being evaporated, or by mixing these salts with oils or greases which are used in any event in vacuum processes as they have a vapour pressure of $10^{-5}$, $10^{-6}$, or less.

In the embodiment of the invention described with reference to Figs. 1–7 the formation of the electronic copy of the colour electrode or grid and the shifting of this electronic copy has been accomplished by controlling the electrons near to the scanned surface, the controlling agency being active simultaneously over the whole area of the scanned surface. Such a spatial control, as it may be termed, whilst affording great simplicity on the electrical side of the equipment does necessitate modifications in the structure of the cathode ray tube itself, as for example, the introduction of the extra grid or grids. It is within the scope of the present invention, however, to substitute for this spatial control a control in time: that is to say, the controlling agency acts successively and not simultaneously on the various elements of the scanned surface. Such a temporal control enables an existing electrode of the cathode ray tube, namely the control grid of the electron gun, to be employed both as the colour electrode and the colour deflector, at the expense of a certain increase in the complexity of the electrical equipment.

Figure 8:
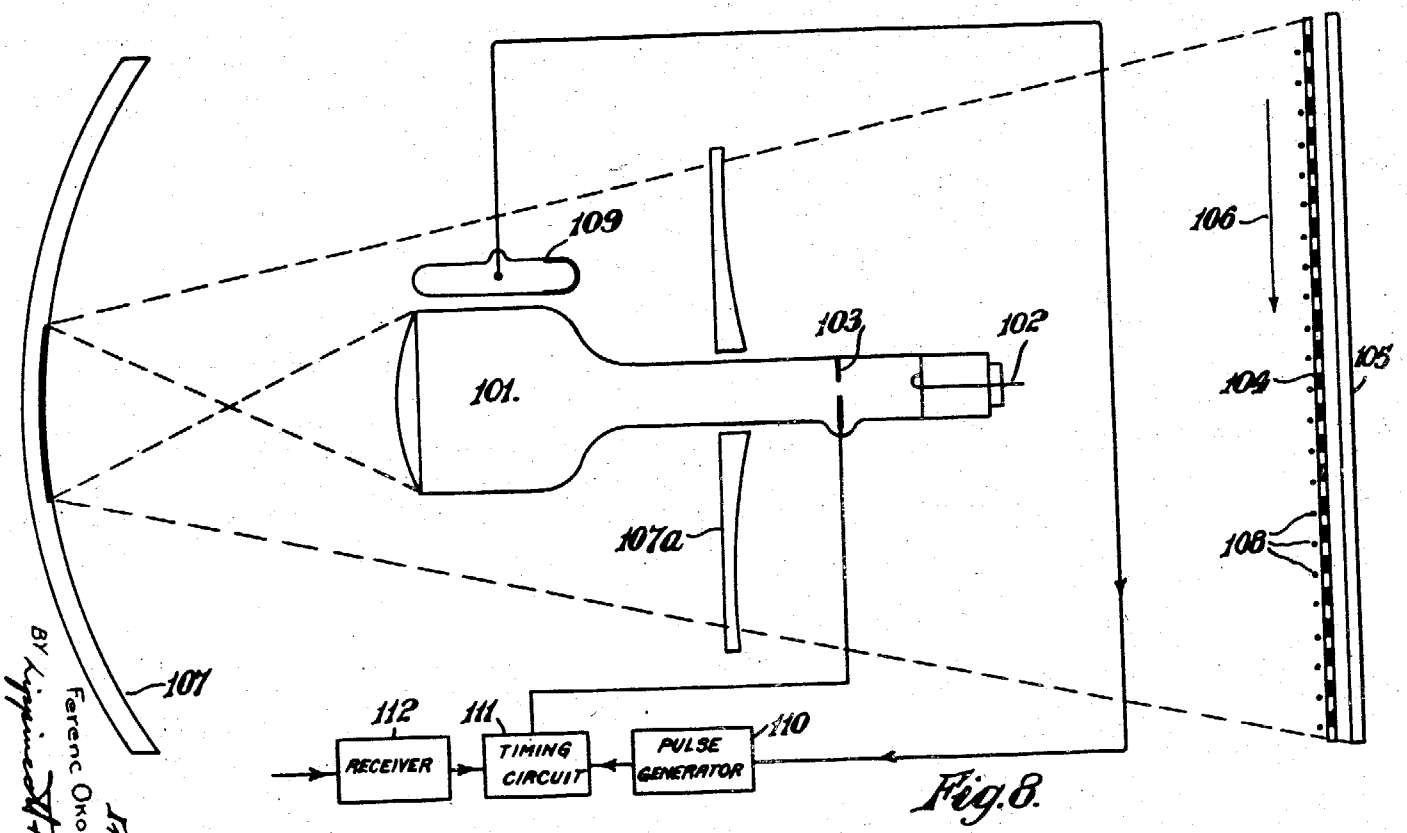
Fig. 8 shows a television receiver employing an alternative form of the invention.

In Fig. 8 a receiver operating on this principle is shown. The receiver comprises a normal cathode ray tube 101, the cathode 102 and control grid 103 being shown, but not the remaining electrodes or deflectors. A black-and-white picture is produced on the fluorescent screen of the tube and this is projected on to the receiving screen 105 by means of a Schmidt optical system consisting of a concave mirror 107 and correcting plate 107a. In front of the viewing screen is placed a filter 104 consisting of alternate red and green strips running at right angles to the scanning direction 106. In front of the filter is arranged a master grid 108 consisting of parallel metal wires having a highly reflecting surface, one such wire lying opposite the junction of each pair of filter strips. As the scanning beam passes across each wire in turn, a flash of light is reflected into the photo-electric cell 109. This cell triggers a pulse generator 110 the output of which will consist of short voltage pulses occurring at element frequency. This generator is not responsive to any charges of illumination occurring on the viewing screen, but only to the high frequency flashes produced by reflection from the metal wires of the grid 108. The pulses from 110 pass through a timing circuit 111 to the control grid, arriving on this grid as negative pulses of sufficient amplitude to substantially cut-off of the electron beam for the duration of each pulse. Clearly the effect will be to produce an electronic copy of the grid 108 on the surface of the fluorescent screen so that the black-and-white image will consist of alternate dark and white lines running parallel to the wires of the master grid 108. The timing circuit 111 includes a resistance-condenser combination and also a valve the internal resistance of which determines the time-constant of the whole combination. This internal resistance is changed from one value to another by applying the appropriate synchronizing impulses from the receiver circuits 112 to the control grid of the valve. Consequently during one colour period which may be the duration of a frame, but is preferably the duration of a line, a certain time delay is imposed on the pulses arriving at the grid 103 whilst during the next colour period, the magnitude of this delay is changed by an amount sufficient to ensure that the bright lines of the projected image are shifted to coincide with the filter strips of the appropriate colour. The build-up of the final coloured image is the same as that described with reference to Figs. 2a and 2b according to whether the colour shift takes place at frame or line frequency.

Figure 9A:
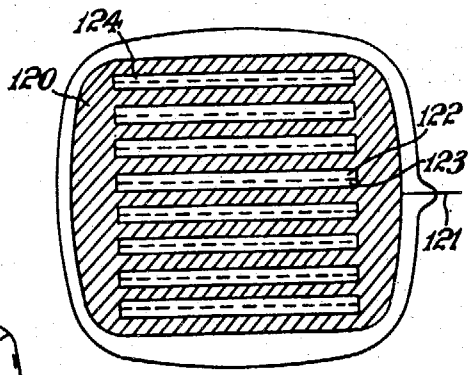
Figs. 9–9b show an alternative system operating on the principle of the system shown in Fig. 8.
Figure 9B:
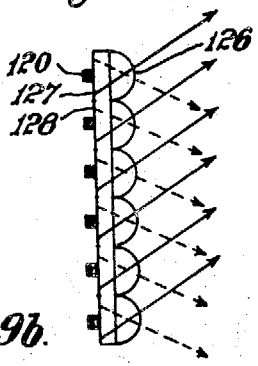
Figure 9:
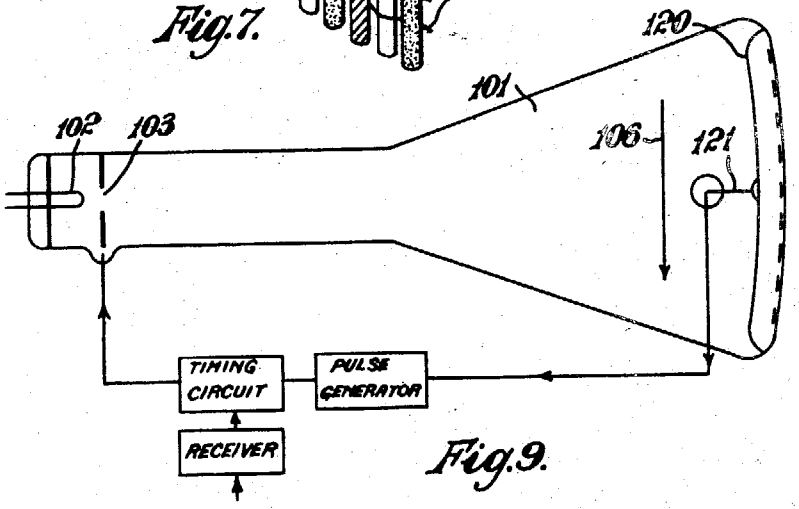

An alternative arrangement is shown in Figs. 9 and 9a. Here the interruption of the electron beam is caused by pulses derived from the impart of the beam itself on a metallic grid 120 connected through wire 121 to the impulse generator 110, thus avoiding the use of a photo-electric cell. Different colours are imparted by using fluorescent powders 122 and 123 of different colour emission deposited in the gaps 124 of the grid, in the form of alternating strips. In Fig. 9 is shown how such an arrangement can be employed to produce projected pictures. The fluorescent screen 125 is a uniform screen producing white light, and carries the grid 120 on one surface. On the opposite surface it is provided with a series of parallel transparent flutings 126. Each fluting lies opposite one of the metallic strips and acts as a short focus cylindrical lens focussed on the fluorescent layer. Consequently as the line image shifts from one position 127 to the other 128, the direction of the beam of light emerging from the cylindrical lens will change through a considerable angle. The beam is focussed on the viewing screen by a large projection lens of mirror such as 107 in Fig. 8 and this mirror is arranged to receive the light beams on one or other distinct part of its surface and each of these parts can be covered by the appropriate homogeneous colour filter. Clearly this optical system has the advantage that the use of a composite colour filter made up of adjacent strips is avoided, and the use of this system is not restricted to the embodiment described in Figs. 9 and 9a.

I claim as my invention:

[1. In a television system employing a cathode ray tube including a surface scanned in discrete lines by an electron beam, the provision of a cylindrical electron-optical system including a master grid within said tube in close proximity to said surface, said electron optical system including a plurality of co-planar conductors serving to impose a line structure on the electron distribution over said surface, means for applying the same voltage to all of said conductors, means for periodically varying the voltage applied to said conductors for periodically deflecting said line structure into at least two alternate positions, and colour selective means arranged in fixed spatial relationship to said positions, said lines of scanning and said imposed line structure being displaced at an angle to one another.]

[2. In a television system employing a cathode ray tube including a surface scanned in discrete lines by an electron beam, the provision or a cylindrical electron-optical system including a plurality of co-planar conductors and including a master grid of parallel metal members within said tube arranged to cast an electron shadow on said surface and thus to impose a line structure on the electron distribution over said surface, means for applying the same voltage to all of said conductors, means for periodically varying the voltage applied to said conductors for periodically deflecting said line structure into at least two alternate positions, and colour selective means arranged in fixed spatial relationship to said positions, said lines of scanning and said imposed line structure being displaced at an angle to one another.]

[3. In a television system employing a cathode ray tube including a surface scanned layer electron beam, the provision of means as claimed in claim 2 wherein said deflecting means comprise deflecting coils surrounding said master grid and a square-wave generator connected to said coils and to a source of synchronizing impulses.]

[4. A television receiver comprising a cathode ray tube, an electron gun, line and frame sweep deflectors and a fluorescent screen for said tube, a plurality of co-planar conductors, a master grid comprising parallel members arranged at an angle to the line scanning direction of said tube, said grid being arranged in said tube close to said fluorescent screen to throw an electron shadow on said screen, a source of synchronizing signals, deflecting means connected to said source and arranged to shift said shadow into at least two alternative positions and colour-selective means appropriate to each of said positions arranged in fixed spatial relationship with respect to said grid.]

[5. A television receiver comprising a cathode ray tube, an electron gun, line and frame sweep deflectors and a fluorescent screen for said tube, a cylindrical electron-optical system including a plurality of co-planar conductors including at least one grid of parallel members arranged in said tube close to said fluorescent screen, all said grid members being at substantially all times during scanning substantially equipotential, a source of synchronizing signals connected to said system and arranged to shift the line structure produced on said screen by said system into at least two alternative positions, and colour-selective means comprising alternating strips of different colours, each appropriate to one of said positions, running parallel to and equal in number to the members of said grid, and arranged in fixed spatial relationship thereto, the direction of scanning produced by said line deflector and the direction of said produced line structure having such angular relationship with one another as to form a repeatedly intersecting pattern.]

[6. A television receiver according to claim 5 wherein the electron optical system comprises said grid and a transparent metal layer on said fluorescent screen means being provided for supplying a voltage difference between them and said synchronizing impulses being applied to one of them to vary the voltage difference.]

[7. A television receiver according to claim 5 wherein the electron optical system comprises a plurality of grids, each grid lying in a different plane from any other grid.]

[8. A television receiver according to claim 5 wherein said colour selective means comprise alternating parallel glass rods of different colours.]

[9. A television receiver according to claim 5 wherein said colour selective means comprise a fabric formed from fine glass fibres of different colours interwoven with a fine metallic wire cross-mesh.]

*10. A cathode-ray tube having included within its evacuated envelope at one end an electron gun adapted to generate an electron beam and to bring the beam to a substantially focused state at a viewing plane spaced therefrom, said viewing plane comprising a target area within the tube in a region remote from the gun toward which the electron beam is directed, said target area being formed of material adapted to respond to the generated electron beam to develop light at the area of instantaneous beam impact, said electron beam being adapted to be deflected bidirectionally relative to the impacted target to trace thereon an image area, an electron lens comprising a plurality of electrode elements each of substantially like area and of an area substantially like that of the target and disposed substantially parallel to the target, each electrode of the plurality being permeable to electrons of the beam, one of said lens electrodes comprising an electron permeable metal layer coating that surface of the target faced toward the electron gun, the other of said lens electrodes comprising a plurality of spaced conductor elements parallel to one another and spaced apart from each other by distances approximating the electron*

*beam cross section at its smallest area, the parallel conductors being located between the metal layer and the electron gun and in the region of target, the said spaced conductors being adapted to define an aperture between each pair of conductors with each aperture defining the pupil of an electron lens, and terminal connections adapted to supply to each of said lens electrodes different potentials to focus the electrons of the beam entering the pupil upon the target within an area of the target which is of smaller dimension than said pupil.*

*11. A cathode-ray tube having included within its evacuated envelope at one end, electron gun structure adapted to generate an electron beam and to bring the beam to a substantially focused state at a viewing plane spaced therefrom, said viewing plane comprising a target area within the tube in a region toward which the electron beam from the gun is directed, said target area being formed of material adapted to produce light as a result of electron beam impact thereon, said electron beam being adapted to be deflected bi-directionally relative to the target to trace a raster thereon, an electron permeable metal layer coating that surface of the target adapted to be impacted by the electron beam, a grid element comprising a plurality of parallelly arranged conductor elements spaced apart from each other by distances of the order of the cross-section of the developed electron beam at its area of smallest cross-section and of such size relative to the beam cross-section as to intercept a negligible portion only of the said beam, said parallel conductors being at a substantially uniform distance from the target and substantially parallel and adjacent to the metal layer and located between the metal layer and the electron gun, the combination of the parallelly arranged conductor elements and the metal layer forming the electrodes of a converging electron lens system with the spaced conductors being adapted to define an aperture between each pair of conductors with each aperture defining the pupil of the electron lens, and terminal connections adapted to supply to each of said lens electrodes different potentials relative to the electron source to focus the electrons of the beam entering the pupil upon the target within an area of the target which is of smaller dimension than said pupil.*

*12. A cathode-ray tube having included within its evacuated envelope at one end, electron gun structure adapted to generate an electron beam adapted to be brought to a substantially focused state at a viewing plane spaced therefrom, said viewing plane comprising a target area within the tube in a region remote from the gun*

*and to which area the electron beam is directed, said target area being formed of material adapted to produce light as a result of electron beam impact thereon, said electron beam being adapted to be deflected bi-directionally in the region of its origin so that with impact at the target a raster is traced thereon, an electron permeable metal layer coating that surface of the target adapted to be impacted by the electron beam, a grid structure comprising a plurality of parallelly arranged conductor wires spaced apart from each other by distances of the order of the cross-section of the developed electron beam at its area of smallest cross-section, the said wires being of a diameter which is small relative to the beam cross-section so that substantially all electrons of the beam reach the target plane, said parallel conductors being located substantially adjacent to the metal layer and between the metal layer and the electron gun, the combination of the parallelly arranged conductor elements and the metal layer forming the electrodes of a generally cylindrical electron lens system with the spaced conductors being adapted to define an aperture between each pair of conductor wires with each aperture defining the pupil of the electron lens, and terminal connections adapted to supply to each of said lens electrodes different potentials relative to the electron source to focus the electrons of the beam entering the pupil upon the target within an area of the target which is of smaller dimension than said pupil and to accelerate the beam in the region between the grid and the target.*

FERENC OKOLICSANYI.

References Cited in the file of this patent or the original patent

UNITED STATES PATENTS

| Number | Name | Date |
|---|---|---|
| 2,150,159 | Gray | Mar. 14, 1939 |
| 2,296,908 | Crosby | Sept. 29, 1942 |
| 2,307,188 | Bedford | Jan. 5, 1943 |
| 2,310,863 | Leverenz | Feb. 9, 1943 |
| 2,315,367 | Epstein | Mar. 30, 1943 |
| 2,343,825 | Wilson | Mar. 7, 1944 |
| 2,415,226 | Sziklai | Feb. 4, 1947 |
| 2,446,249 | Schroeder | Aug. 3, 1948 |
| 2,446,791 | Schroeder | Aug. 10, 1948 |
| 2,455,710 | Szegho | Dec. 7, 1948 |
| 2,461,515 | Bronwell | Feb. 15, 1949 |

FOREIGN PATENTS

| Number | Country | Date |
|---|---|---|
| 434,868 | Great Britain | Sept. 6, 1935 |